United States Patent Office 3,232,681
Patented Feb. 1, 1966

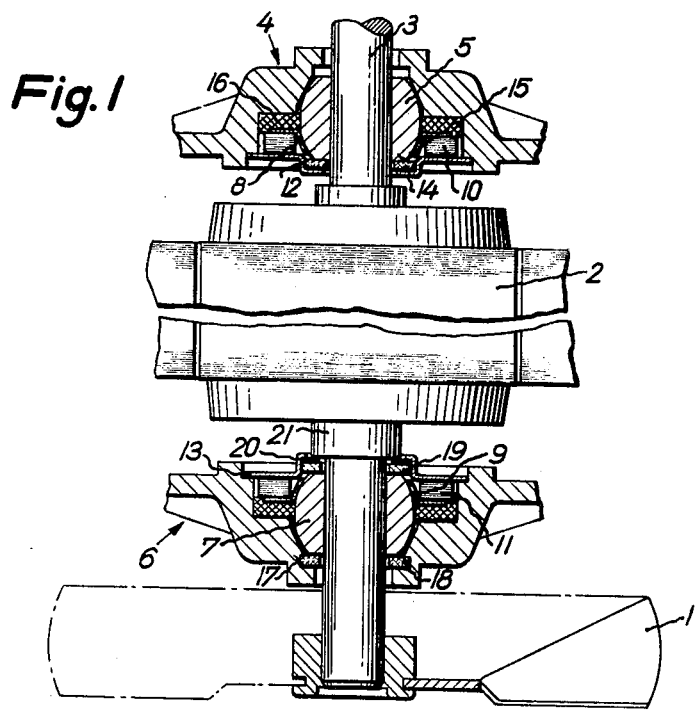
Fig.1
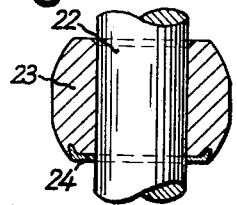
Fig.2
Fig.3
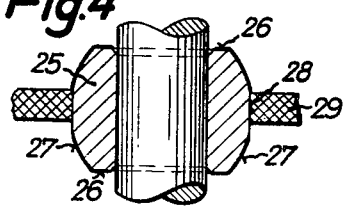
Fig.4
Rudolf Mittmann
Hans-Joachim Janssen
Klaus Frohmüller
Inventors:
By: George H. Spencer
Attorney

3,232,681
BEARING
Rudolf Mittmann, Oldenburg, Hans-Joachim Janssen, Hundsmuhlen uber Oldenburg, and Klaus Frohmüller, Oldenburg, Germany, assignors to Licentia Patent-Verwaltungs-G.m.b.H., Frankfurt am Main, Germany
Filed Dec. 18, 1961, Ser. No. 160,103
Claims priority, application Germany, Dec. 19, 1960, L 37,768
3 Claims. (Cl. 308—36.1)

The present invention relates generally to the bearing art, and more particularly to sintered friction bearings of the type having a porous structure acting as carrier for the lubricating oil.

In sintered friction bearings, the material, due to its porous structure, may carry the necessary lubricating oil. This eliminates the need for an oil supply connected to the bearing opening, which is necessary in other types of friction bearings. It is believed that the oil circulation via the bearing opening and the shaft, the lubricating rings, and the external oil path return, may be eliminated in sintered friction bearings.

However, in addition to the circulation of oil internally of the sintered material, some oil flows along the shaft and is lost. In an effort to avoid the necessity for entirely relubricating the device, and also because of the necessity of carefully choosing the oil to be used, there has been a return to the arrangement using lubricating rings and an external oil return path, in various embodiments of bearings. Therefore, the advantage of the simple type bearing was, to a large extent, lost or obviated. Other attempts to avoid loss of oil include compensating for this loss by additional or reserve lubrication in the form of oil-impregnated felt rings or the like, which are placed surrounding or on the bearings, but they do not provide satisfactory results.

All of these attempts begin with the concept that, as in the other friction bearings, the oil exits from the bearing opening and runs along the shaft, and this concept was the basis for the attempts which have been made in the past. However, it has been found that, due to the pressure gradient in the bearing material which is caused by the pressure and sutcion zones in the bearing opening, the oil is discharged in the form of small droplets and bubbles, especially at the ends or sides of the sintered friction bearings, and in an increasing measure towards or near the shaft. From there the oil which gradually escapes reaches the shaft and exerts a suction effect upon the oil film in the bearing opening. This phenomenon is expedited by fine hairs, for example, hairs from the abutting felt rings which are used. However, in the absence of the above conditions, there will be no oil loss from the bearing opening if there is a correct selection of all the values having an influence upon the arrangement.

With these defects of the prior art in mind, it is a main object of the present invention to provide a sintered friction bearing which is extremely simple and in which proper internal circulation of oil take place.

Another object of this invention is to provide a sintered bearing of the type described wihch obviates the defects of the prior art.

A further object of the invention is to provide a bearing arrangement which may be used in motors and which aids in eliminating motor vibrations.

These objects and others ancillary thereto are accomplished according to preferred embodiments of the invention, wherein the sintered bearing is provided with external surfaces which are totally or partially sealed against the escape of lubricating oil, and especially the end surfaces thereof. This may be done in various manners, such as: by applying an oil-tight or oil-proof coat of varnish; by spraying a thermoplastic resin on the bearing, or covering the friction surface of the bearing and immersing the bearing in a resin; and by tightly pressing annular disks against the bearing duirng the manufacture of the bearing or simply by pressing soft elastic oil-sealing annular disks onto the bearing, for example, rubber disks which are not very hard, which latter are, in most cases, suffiicient to prevent escape of oil at the end surfaces.

When using a small electric motor having its shaft vertically disposed the use of soft elastic disks is an advantageous and inexpensive arrangement providing a novel inventive effect. In sound recording equipment, for example, driving gears for phonograph records, tape recorders, etc., the drive motors are usually mounted with the shaft axis in a vertical position. In this type of apparatus any source of vibration should be carefully insulated and positions which provide resonant vibrations should be avoided. Insulation of the axiial vibrations of the motors is particularly difficult.

According to the invention, when a motor is vertically mounted, the upper end surfaces of the lower sintered friction bearing are insulated by using soft elastic annular rubber disks, used with a guard plate or buffer disk, for example, one of polyamide interposed as a thrust bearing for the motor. At the same time, this eliminates a source of vibration and also provides an effective hypercritical detuning with respect to power main frequency. When the shaft of a motor is in a vertical position a further advantage is provided by the fact that the lower end of the shaft is free and is available for attaching thereto an air impeller or ventilator for the motor, or for a secondary drive connection. The usual type of ball thrust bearing is omitted.

In the case where there is only partial sealing of the outer surfaces of the bearing, this does not preclude the use of additional lubrication or reserve lubrication in the form of a felt ring or the like which may be placed about the bearing.

Additional objects and advantages of the present invention will become apparent upon consideration of the following description when taken in conjunction with the accompanying drawing in which:

FIGURE 1 is a vertical sectional view taken through a sintered friction bearing assembly of the present invention wherein the shaft of a motor is disposed in a vertical position and soft elastic annular disks are used.

FIGURE 2 is a sectional view illustrating a generally spherical bearing having a sealing disk pressed into one end thereof.

FIGURE 3 is a sectional view similar to FIGURE 2 having an annular disk pressed into each end.

FIGURE 4 is a sintered generally spherical bearing having a coating which provides a proper oil seal and which also is provided with additional lubricating means.

With more particular reference to the drawings, FIGURE 1 illustrates a portion of a small electric motor having its shaft axis disposed in a vertical position. An air impelling or ventilator wheel 1 is disposed at the lower end of the shaft for cooling purposes. Only the rotor 2 and the shaft 3 of the motor are shown. An upper bearing assembly 4 is illustrated in section, and is of the type having a sintered friction bearing 5. The lower bearing assembly 6 is also illustrated in section and has a sintered friction bearing 7.

Bearings 5 and 7 are of the conventional generally spherical shape and are retained in generally cone-shaped or inclined supporting seats which are defined in the bearing assemblies 4 and 6 by the resilient bearing seating rings 8 and 9, respectively. Pressure rings 10 and 11 hold the bearing rings 8 and 9 in place, as do the annular holding disks 12 and 13 which are pressed into bearing assemblies 4 and 6. The annular holding disk 12 of the upper bearing assembly 4 is somewhat dished in its center portion to receive the annular sealing disk 14 which is seated in the dished portion and presses this disk 14 against the lower end surface 15 of the sintered generally spherical bearing 5. In order to increase the amount of lubricating oil within the assembly, a lubricating oil-impregnated felt ring 16 surrounds the bearing within the assembly to provide further lubrication.

The loss of lubricating oil from the lower sintered bearing 7 is prevented in an analogous manner by seating an annular sealing disk 18 in an annular slot 17 in the bearing assembly 6. Annular sealing disk 18 is a little thicker than the depth or the height of the slot 17 so that a sufficient pressure against the lower end surface of the sintered bearing 7 will result. A corresponding relationship is true for the annular sealing disk 14. Foam rubber is an especially favorable material from which to construct the annular sealing disks, since it may provide a smooth and non-porous surface against the sintered friction bearing.

An annular sealing disk 19 is placed against the upper end surface of the lower sintered bearing 7 and a guard plate 20 is placed above this disk. This guard plate may preferably be constructed of polyamide, indurated fabric, hard plastic, or the like. The weight of the rotor against the counter guard member 21, which is integrally connected with the shaft 3, presses the sealing disk 19 and its guard plate 20 into position. At the same time this guarantees that there will be a parallel relationship of the guard elements 20 and 21 and will thus eliminate a source of vibration while, on the other hand, the resilient element, i.e., the soft elastic annular disk, provides hypercritical detuning of the rotor with respect to the power main frequency.

In a variation of this arrangement, a very advantageous and simplified design of a bearing assembly may be provided when the motor axis is horizontally disposed, if the two annular sealing disks 14 and 19 are pressed into place via holding rings 12 with the interposing of guard plates which are so large in thickness between inner and outer diameter that the center openings of the holding rings 12 may be larger than the guard members on the shaft without there being any oil leakage.

In FIGURE 2 an arrangement is illustrated wherein a vertically disposed shaft 22 is mounted in a sintered bearing 23 and wherein the lower end surface is sealed to prevent escape of lubricating oil. The sealing in this case is done by pressing a metal disk 24 into this end surface. The disk may be made of steel if desired.

FIGURE 3 illustrates another arrangement of the sintered bearing wherein the assembly is disposed with the shaft in a horizontal plane and wherein both end surfaces of the bearing are sealed by using disk 31 which are pressed into the ends of bearing 30.

FIGURE 4 illustrates an arrangement wherein a sintered bearing 25, in addition to having the end surfaces 26 sealed, also has the curved surface 27 sealed by a coat of varnish or the like. However, the seal is not provided over a cylindrical area on the outer surface 28 of the bearing. At this position a felt ring 29 abuts against the cylindrical surface and may have lubricating oil disposed therein so that additional lubrication is provided for the bearing assembly.

It will be understood that the above description of the present invention is susceptible to various modifications, changes, and adaptations, and the same are intended to be comprehended within the meaning and range of equivalents of the appended claims.

What is claimed is:
1. A bearing arrangement for small electric motors and the like, comprising, in combination:
   (a) vertically disposed rotor means including a shaft;
   (b) a bearing assembly on each side of said rotor means and rotatably accommodating said shaft, each bearing assembly including
      (1) a bearing body of sintered material,
      (2) means sealing the end surfaces of said bearing to seal the ends of the bearing against the escape of oil, said means including a soft elastic annular disk pressed against the rotor facing end surface of said bearing, and
      (3) a guard plate interposed between said rotor means and the disk of the lower bearing assembly with at least a portion of the weight of said rotor pressing against said disk via said guard plate.

2. A bearing arrangement as defined in claim 1, wherein each bearing assembly includes a holding ring for pressing the disk against the bearing and for holding the bearing in said assembly; said rotor means including a counter guard member resting on the guard plate, the internal diameter of the lower holding ring being larger than the outer diameter of the counter guard member.

3. A bearing assembly comprising:
   (a) a shaft having a shoulder therealong formed by a guard member; and
   (b) bearing means in which said shaft is journalled in the vicinity of said shoulder and including
      (1) a body of oil soaked sintered metal material in the form of a bearing having an internal bearing surface,
      (2) sealing means directly covering the end surfaces of said body to seal the ends of said body against the escape of oil, and including soft elastic annular disks pressed against the end surfaces of said body,
      (3) holding ring means for pressing one of said soft elastic annular disks against said body and for holding said body, and
      (4) a guard plate interposed between said one disk and said ring means and engaging said shoulder, the inner diameter of said ring means being larger than the outer diameter of said guard member.

References Cited by the Examiner

UNITED STATES PATENTS

| | | | |
|---|---|---|---|
| 1,656,508 | 1/1928 | Claus. | |
| 1,939,444 | 12/1933 | Geyer. | |
| 2,093,800 | 9/1937 | May. | |
| 2,124,479 | 7/1938 | Whitaker. | |
| 2,137,434 | 11/1938 | Wood. | |
| 2,139,373 | 12/1938 | McKinley et al. | |
| 2,228,406 | 1/1941 | Schmidt. | |
| 2,246,086 | 6/1941 | Austin. | |
| 2,316,693 | 4/1943 | Hoddy | 308—132 |
| 2,734,785 | 2/1956 | Toulmin | 308—240 |
| 2,892,662 | 6/1959 | Scheel | 308—36.1 |
| 2,922,682 | 1/1960 | Abel | 308—132 |
| 3,111,743 | 11/1963 | Ernst | 308—240 |

FOREIGN PATENTS 135,882    5/1952    Sweden.

OTHER REFERENCES

Sintered Nylon Plastic, by Kenneth Harms, published in Product Engineering, November 1954, pages 150 through 153 relied upon.

DON A. WAITE, *Primary Examiner.*
FRANK SUSKO, *Examiner.*